United States Patent [19]

Tucker

[11] Patent Number: 4,907,971
[45] Date of Patent: Mar. 13, 1990

[54] SYSTEM FOR ANALYZING THE SYNTACTICAL STRUCTURE OF A SENTENCE

[76] Inventor: Ruth L. Tucker, 1130 Pacific Beach Dr., San Diego, Calif. 92109

[21] Appl. No.: 262,988

[22] Filed: Oct. 26, 1988

[51] Int. Cl.⁴ .................................................. G09B 19/00
[52] U.S. Cl. ..................................................... 434/167
[58] Field of Search ............................... 434/167, 156

[56] References Cited

U.S. PATENT DOCUMENTS 3,270,430 9/1966 Hurst ..................................... 434/167
4,171,816 10/1979 Hunt ................................. 434/167 X

*Primary Examiner*—William H. Grieb
*Attorney, Agent, or Firm*—Brown, Martin, Haller & McClain

[57] ABSTRACT

A method of syntactically categorizing the constituents of English language sentences and a schema for depicting all possible categories to which the constituents of any sentence could belong. It also depicts the general order to appearance of the basic elements (foundation elements) in a sentence and their alignment according to the functions they perform in a sentence, the alignment being informative to a schema user of certain relationships between constituents of a common function. In one embodiment of the schema, all possible forms and functions of foundation elements are depicted in a plurality of adjacent rows, all rows being parallel to an ordinate, each row containing only foundation elements of a common form in the general order of their common use in a sentence, the number of rows corresponding to the number of forms of foundation elements; all possible forms and functions of modifying elements are depicted in a plurality of adjacent rows, all parallel to said ordinate, each row being ordered to correspond to the foundation elements which they modify, and each row containing only modifying elements of a common form, the number of rows corresponding to the number of forms of modifying elements. In another embodiment, all forms and functions of modifiers of modifying elements are also depicted in a plurality of adjacent rows parallel to said ordinate, each row being ordered to correspond to the modifying elements which they modify, and each row containing only modifiers of modifying elements of a common form.

12 Claims, 2 Drawing Sheets

FIG. I

SYSTEM FOR ANALYZING THE SYNTACTICAL STRUCTURE OF A SENTENCE

BACKGROUND OF THE INVENTION

This invention relates in general to systems for analyzing and synthesizing the syntactic construction of a complete thought expressed in the English language by categorizing each major constituent of the expressed thought into one of a set of categories, and in particular to such systems wherein a user of such systems is aided by diagrammatic representations, or schemas, of the categories and their interrelationships.

All communications in the English language can be separated into discrete, complete thoughts, each such thought being called a "sentence." Each discrete, complete thought is comprised of foundation elements, modifiers, and function words. As used hereinafter the meaning of the term "sentence" (and its plural forms) includes any expression of such a discrete, complete thought.

This invention presents a novel and unique system comprising a method of syntactically categorizing the constituents of any English language sentence and a diagrammatic representation, or schema, of the categories and their interrelationships. The schema is used as an aid to analyze and/or synthesize sentences. The schema is, in effect, a linguistic template for testing the accuracy of the syntactical construct or form of a sentence.

When a person becomes familiar with the system and its schema, the person's ability to recognize phrases and clauses is generally increased as is his or her speed of recognition. The use of the system and its schema helps the user to perceive and separate the foundation elements and their modifiers. In the mind's eye the foundation elements are seen as figures in bold relief against a background of modifiers.

Knowledge of what makes successful learning has essentially not changed. In the early nineteen hundreds, Dewey (Dewey, J. *How We Think*, Boston: D.C. Health, 1910) and Thorndike (Thorndike, E. L. Reading as reasoning: a study of mistakes in paragraph reading., *Journal of Educational Psychology*, 1917, 8, 323-332) insisted that to be successful learners must analyze themselves as to their strengths and weaknesses, know the task, and actively seek meaning and relationships. Today we call this metacognition. Today's "students at risk" who are employing text processing, selective attention, cue retrieval, self-questioning strategies, self-monitoring, etc. need more. The rote memory of abstract grammar rules will not assist them in their desire to improve their communication in written and oral expression. The use of a comprehensive, concrete, language syntax roadmap may help those who are lost in the maze, those who feel insecure in the use of their language, and those who would like to improve their language competency. Thus, This invention is useful for all pursuers of communication competency—those in the school, the home, and the working world. It is especially needed by those encountering language communication problems-those students in remedial education, in special education, and minority and ESL students. Language is used to communicate with one's self and with others. The more competent a person is in this symbolic manipulation, the more efficient, effective, and harmonious the person will be with himself and others.

It is time to streamline grammar instruction. As far back as 1950, Margaret Mead said that every three of four years education needs a new theory. (Carroll, J. B. Comments on: Comprehension during the acquisition of decoding skills. In J. T. Guthrie (Ed.), *Cognition, curriculum, and comprehension*. Newark, Del.: International Reading Association, 1977) It was surmised that her comment was probably prompted by the commonly held thought that those interested in successful education must constantly rethink their objectives and methods until there is evidence inside and outside the classroom that students are successful. In "A Nation Prepared:Teachers for the 21st Century", the Carnegie Forum on Education and the Economy (1986) called, not for the repair, but for the rebuilding of the present education system. They stated that we need teaching that goes beyond acquiring a stock of facts to one in which students become adept at thinking for themselves.

It is commonly acknowledged that the heart of thinking is in the partnership between semantics and grammar. We have been told that transformational grammar has lost its glow because of its abstraction and complexity understandable only to linguists. (Peters and Waterman, 1982) What is needed, said Henry (Henry, G. H. *Teaching reading as conceptual development*. Newark, Del.: International Reading Association, 1974), for the common condition that students do not understand grammar but have merely a superficial knowledge of isolated elements is the possession of a whole map with its pieces and relationships explicitly taught. This invention provides just that. This invention puts into bold, understandable relief a comprehensive, complex English grammar system. It is not abstract, and one does not have to be a linguist to understand it. Not only is it a multisensory approach using graphics and color mnemonics but it is a multimodal approach integrating perceptual, cognitive, and procedural strategies.

The grammar of a language is the system by which symbolic units represent meaning. The syntax or sentence structure word order is the major feature of the syntax. The eight parts of speech are the words in the syntax. Of these eight words, the major essentials of human thought are expressed by nouns, pronouns, and verbs which the system of this invention considers the FOUNDATION WORDS of thought. Adjectives and adverbs are MODIFIERS of foundation words. In addition to these five, the three remaining parts of speech, the preposition, conjunction, and interjection are considered function words. Goodman (Goodman, K. S. Reading: a psycholinguistic guessing game. In H. Singer & R. B. Ruddell (Eds.), *Theoretical models and processes of reading*. Newark, Del.: International Reading Association, 1967), and others have said that function words have no lexical meaning but they make it possible to create sentence patterns to express virtually unlimited meanings. To place meaning on the prepositional word rather than the prepositional phrase is to create a roadblock in efficient and effective communication. Foust (Foust, C. D. The relationships between understanding prepositions and reading comprehension, unpublished doctoral dissertation, Ohio State University, 1975) came to this deadend when his subjects showed that they could use prepositions quite early but they were unable to define their meaning. This is understandable because meaning is in the larger prepositional phrase unit and not in the preposition word. The same can be said for the subordinate conjunction and relative pronoun in relation to the larger adjective and adverb clause structures. Phrases and dependent clause structures are interpreted as cohesive meaning structures— not as strings of singly important words. For example, the following constructions have the same meaning: The tanned lifeguard is John; the lifeguard with a tan is John; the lifeguard who has a tan is John. The surface structures of word-phrase-clause adjective modifier are transforms of the deep structure, "tan" meaning. The outward form looks different, but the meaning is the same. The user learns to perceive prepositional phrases and subordinate clauses as single units which are adjective or adverb chunk modifiers. A figure-ground perceptual relationship exists. "One cannot see the trees for the forest" is a famous analogy. Sentence meaning can be obscured by the forest of modifiers and function words surrounding the main sentence's subject-verb-object, etc. This invention accents focusing on the Foundation Words as FIGURES while at the same time being aware of the Modifiers (word-phrase-clause) as BACKGROUND. Meaning is kept in bold relief. Meaning has the highest focus, and the formula to extract the meaning is part of the procedural strategy. Meaning is developed from the self-questioning strategy of asking: Which who-did-which-what-how-why-when-where-extent, etc. Guthrie (Guthrie J. T. Reading comprehension processes and instruction. In J. T. Guthrie (Ed.), *Cognition, curriculum, and comprehension*. Newark, Del.: International Reading Association, 1977) believes that the learner should be taught to locate these grammatical constituents in order to be able to answer these explicit questions.

Beck (Beck, I. L. Comments on: Development parameters of reading comprehension. In J. T. Guthrie (Ed.), *Cognition, curriculum, and comprehension*. Newark, Del.: International Reading Association, 1977) has mentioned the need to teach comprehension rather than emphasize attention to textual material and activities which enhance word recognition. Gibson (Gibson, E. J. Trends in perceptual development: Implications for the reading process. In H. Singer & R. B. Ruddell (Eds.), *Theoretical models and processes of reading*. Newark, Del.: International Reading Association, 1985) is a well known perceptual psychologist who agreed with those who like Huey (Huey, E. B. *The psychology and pedagogy of reading*. New York: Macmillan, 1908) said that the reader's acquirement of ease and power in reading comes through increasing ability to read in larger units. Her perceptual studies led her to conclude that there are rules or predictable relations within words, and there are relations, syntactical rules and meaningful relations between words in phrases, sentences and passages of discourse. She mentioned that learners actively search for a target. The learner seeks to know who-did-what. Schools have concentrated more on Learning to Read than Reading to Learn. This invention is an attempt to replace word-by-word reading with the strategy of reading for meaning by getting answers to meaningful questions by processing meaningful cohesive syntax content.

This invention has addressed the ambiguity of complex abstract content by expressing the content concretely and graphically. Within current cognitive theory, it is mentioned that the learner has a tolerance for ambiguity. As a safety valve against permanent overload, the learner searches to break down complex content into component parts which are understood in relation to the whole. In order for the learner to confront difficult learning and endure ambiguity during difficult stages, the learner must be convinced that eventually he or she will have control. With the use of this invention, the student can predict the results with confidence and certainty. His or her possession of a usable map, i.e., schema inspires and generates more learning and inquiry. Knowing the schema and using the schema are the basis of language production. Personal satisfaction in being able to create something of one's own is highly absorbing and challenging. Positive self-attribution influences the quality of one's learning. The goal of education is to bring the factors in controlling comprehension under the control of the learner. Metacognition encompasses the learner's text processing, selective attention, cue retrieval, self-questioning strategies, self-monitoring, etc. Metacognition is the knowledge the learner has about his own learning resources, the learning task, and the ability to reflect on one's own cognitive processes. It is to be conscious of one's self, to plan one's next move, to check the outcome of one's strategy, to monitor the effectiveness of one's effort, and to test, revise,, and evaluate one's learning strategies. Students with learning problems seem less able to be aware of these variables and what to do where there is a problem. The evidence is clear that our "Nation At Risk" has too many school failures. Leaders of industry complain about the poor receptive and expressive language skills of their employees. This invention is an attempt to assist materially with these problems. This invention has universal use. It is useful from those who are literate to those with language limitations regardless of what they do for a living.

Other advantages and attributes of this invention will be readily discernible upon a reading of the text hereinafter.

SUMMARY OF THE INVENTION

An object of this invention is to aid in the understanding and synthesis of English language sentences.

Another object of this invention is to present a system which can be used to enhance a person's ability to recognize phrases and clauses.

Another object of this invention is to present a system which can be used to enhance a person's ability to perceive and separate the foundational elements of an English language sentence from their modifiers.

Another object of this invention is to present a schema which is in effect a linguistic template for testing the accuracy of the syntactic construct of an English language sentence.

Another object of this invention is to present a schema which can be used as the basis of English language production.

Another object of this invention is to present a schema which can be used to enhance a person's ability to perceive and separate the foundational elements of an English language sentence from their modifiers.

Another object of this invention is to present a method of categorizing the constituents of English Language sentences in general in order to create a schema as described in the four preceding paragraphs.

Other objects of this invention will be discussed or readily discernible upon the reading of the text herein.

These and other objects are accomplished by a system for syntactically analyzing the constituents of an English language sentence, the system comprising a method of categorization, and a schema which graphically represents said categorization and shows the interrelationships of said constituents. The method comprises the steps: (a) defining all expressions of the subject of a sentence, all expressions modifying said subject expressions, and all expressions modifying said expressions modifying said subject expressions to be members of a first functional set, (b) defining all expressions of action being performed by or upon a subject expression of a sentence, all expressions linking the subject expression to a predicate expression, all expressions modifying said action or linking expressions, and all expressions modifying said expressions modifying action or linking expressions to be members of a second functional set, (c) defining all expressions of an indirect object of any action, all expressions modifying said indirect object expressions, and all expressions modifying said expressions modifying said indirect object expressions to be members of a third functional set, (d) defining all expressions of a direct object of any action, all expressions modifying said direct object expressions, and all expressions modifying said expressions modifying said direct object expressions to be members of a fourth functional set, (e) defining all expressions which are an object of a preposition, all expressions modifying said object of preposition expressions, and all expressions modifying said expressions modifying said object of a preposition expressions to be a fifth functional set, (f) defining all predicate expressions, all expressions modifying said predicate expressions, and all expressions modifying said expressions modifying said predicate expressions to be members of a sixth functional set, (g) defining each member of the first through sixth functional sets which is in word form to be a member of a first form set, (h) defining each member of the first through sixth functional sets which is a phrase to be a member of a second form set, (i) defining each member of the first through sixth functional sets which is a clause to be a member of a third form set, (j) defining each member of the first through sixth functional sets which is a foundation element to be a member of a first class set, (k) defining each member of the first through sixth functional sets which modifies a foundation element to be a member of a second class set, (l) defining each member of the first through sixth functional sets which modifies a modifier to be a member of a third class set, and (m) defining each function word or its equivalent to be a member of a fourth class set. The categorization method produces four classes, six functional sets, and three forms of English language expressions. A method of creating a schema to represent said categorizations comprises the steps: (1) indicating designators of all foundation elements in a plurality of adjacent lines, all lines being parallel to an ordinate, each line comprising all of the possible foundation elements of a sentence of a common form in the order that said elements are commonly used in a sentence, the number of lines corresponding to the number of forms of said foundation elements, and (2) indicating all designators of all modifying elements in a plurality of adjacent lines, all parallel to said ordinate, each line being ordered to correspond to the foundation elements which they modify, and each line containing only modifying elements of a common form, the number of lines corresponding to the number of forms of modifying elements.

DESCRIPTION OF THE PREFERRED EMBODIMENT

Figure 1:
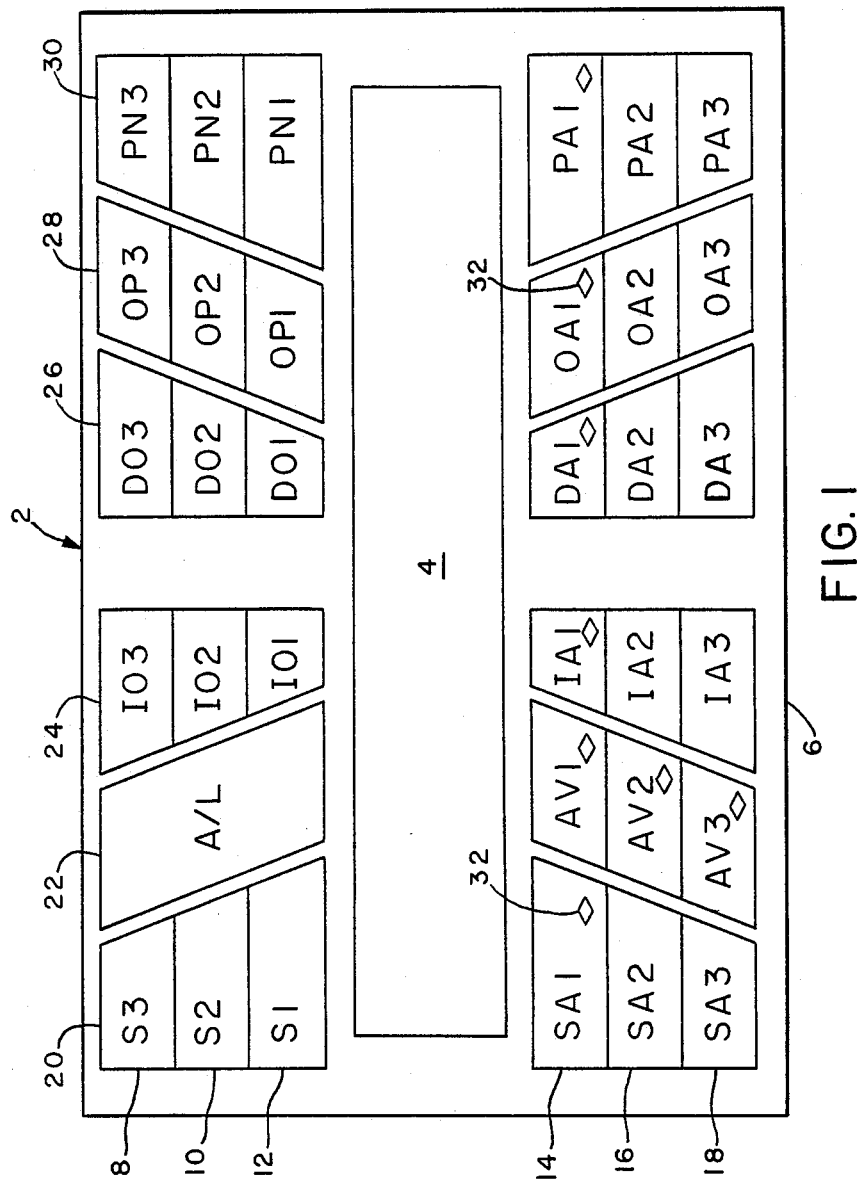
FIG. 1 is a schema of the English language according to this invention.

According to the system of this invention, the major components of an English language sentence are of four classes, to wit: (1) foundation elements, (2) modifiers, (3) modifiers of modifiers, and (4) function words. Foundation elements are nouns, noun equivalents, and verbs performing syntactic functions as the foundational building blocks of a sentence. A noun equivalent is a word group or word not otherwise a noun in a syntactic function ordinarily performed by a noun.

Modifiers are adjectives, adverbs, and their equivalents which perform the syntactic function of modifying a foundation element in a sentence. An adjective equivalent is a word group or word not otherwise an adjective in a syntactic function ordinarily performed by an adjective. An adverb equivalent is a word group or word not otherwise an adverb in a syntactic function ordinarily performed by an adverb. Modifiers of modifiers are adverbs or adverb equivalents which perform the syntactic function of modifying other modifiers.

Function words are those words which have no lexical meaning, but which make it possible to create larger meaningful patterns. Prepositions, coordinating conjunctions, subordinating conjunctions, relative pronouns, and interjections are all function words.

Foundation elements, as defined by this invention, are the most important constituents of a sentence; they are the basic elements of every sentence. According to their functions in a sentence, the foundation elements comprise: (1) the expressions of the subject of the sentence, (2) any expression of action being performed by or upon the subject expression, or any expression linking the subject expression of a sentence to its predicate or predicate expression, e.g., a copula equating the subject expression in meaning to, or identifying the subject expression with an expression which is in a portion of a sentence commonly referred to as the predicate, (3) any expression of an indirect object of an expressed action, (4) any expression of a direct object of an expressed action, (5) any expression of an object of a preposition, and (6) any predicate expression in the form of a noun or noun equivalent to which the subject expression is being linked. Every sentence must have a subject expression, and every sentence must have either an expression of action being performed by or upon the subject expression (commonly referred to as an active or passive verb, respectively) or a linking expression (commonly referred to as a linking verb or copula).

As a first example, consider the sentence, "The soldier fought in the war." The word "soldier" is a foundation element because it is a noun functioning as an expression of the subject of the sentence. The word "fought" is a foundation element because it is an expression of action by the subject, and the word "war" is also a foundation element because it is a noun functioning as an expression of the object of a preposition (in). The phrase "in the war" is a modifier of the foundation element "fought" because it expresses where the soldier fought, i.e., it is an adverb equivalent. The preposition "in" is a function word having no lexical meaning but operating to connect its object (war) with the action expression (fought).

As a second example, consider the sentence, "To fight is dangerous." The infinitive phrase "To fight" is a noun equivalent functioning as a foundation element because it is an expression of the subject of the sentence. The word "is" is also a foundation element because it links the subject expression (To fight) with the predicate of the sentence and particularly with the word "dangerous" which is a modifier of said subject expression because it describes and qualifies the subject.

As a third example, consider the sentence, "Being in a war shows that one is courageous." The phrase "Being in a war" is a noun equivalent, commonly known as a gerund phrase, functioning as a foundation element of the sentence because it is an expression of the subject of the sentence. The word "shows" is also a foundation element because it is an expression of action being performed by the subject of the sentence, and the clause "that he is courageous" is a noun equivalent, commonly known as a noun clause, functioning as a foundation element because it is an expression of a direct object of the action.

As a fourth example, consider the sentence, "The soldier shows that he is courageous by fighting in a war." The phrase "fighting in a war" is a noun equivalent functioning as an object of a preposition (by) and, as such, it is a foundation element. The entire prepositional phrase "by fighting in a war" is an adverb equivalent modifying the action expression "shows." As in the previous example, the clause "that he is courageous" is a noun equivalent acting as a direct object of the expressed action and, as such, it is also a foundation element.

As a fifth example, consider the sentence, "He gave the boy that delivers his newspaper a tip." The expression "He" is a noun equivalent, commonly known as a pronoun, functioning as an expression of the subject of the sentence and, as such, it is a foundation element. The expression "tip" is a foundation element because it is a noun functioning as a direct object expression of the action expression "gave." The expression "boy" is also a foundation element because it is functioning as an indirect object expression of the action. The clause "that delivers his newspaper" is an adjective equivalent, commonly known as an adjective clause, which is functioning as a modifier of "boy."

As a sixth example, consider the sentence, "The soldier who fought in the war is a man of courage." The clause "who fought in the war" is an adjective equivalent modifying the subject expression "soldier." The word "man" is a predicate expression which is a foundation element because it is a noun in the predicate portion of the sentence which is linked to the subject expression by the linking expression "is." The prepositional phrase "of courage" is an adjective equivalent modifier because it qualifies or describes the foundation element "man," and "courage" is also a foundation element because it is a noun functioning as the object expression of the preposition "of."

As a seventh example, consider the sentence, "Whoever fights in a war could be killed." The clause "Whoever fights in a war" is a foundation element of the sentence because it is a noun equivalent functioning as the subject expression of the sentence. The compound word "could be killed" is an expression of action being performed upon the subject expression and is, therefore, a foundation element.

The above examples illustrate that the foundation elements according to the system of this invention include expressions which are in the form of a word, phrase or clause, except for action and linking expressions which are unique and can only take the form of a word. As used in this specification and claims, the terms "word" and "words" refer to and include single words, hyphenated words, and compound words. According to the system of this invention, the foundation elements, except for the action and linking expressions, are categorized according to form as follows: (1) all foundation elements expressed by only a word (noun, pronoun, or the like) are defined as having a first form, (2) all foundation elements expressed by a phrase (e.g., an infinitive or gerund phrase used as a noun equivalent) are defined as having a second form, and (3) all foundation elements expressed by a clause (e.g., a subordinate clause used as a noun equivalent) are defined as having a third form.

The modifying elements are also categorized into three corresponding forms as follow: (1) modifying expressions in the form of a word having a first form, (2) modifying expressions in phrase form (e.g., prepositional phrases and infinitives used as adjective or adverb equivalents) having a second form, and (3) modifying expressions in clause form used as adverb or adjective equivalents having a third form.

Modifiers of modifiers also have three forms: (1) a first form being words that modify a modifier, (2) a second form being phrases used as adverb equivalents to modify a modifier, and (3) a third form being clauses used as adverb equivalents to modify a modifier.

According to the system of this invention, the constituents of an English language sentence are also distinguishable by the function they perform in the sentence. All expressions of the subject of a sentence, all expressions modifying the subject expressions, and all expressions modifying the expressions modifying the subject expressions collectively perform the function of fully defining the subject of the sentence, and are all members of a first functional set. Any expression of action being performed by or upon the subject expression of a sentence, any expression linking the subject expression to a predicate expression, all expressions modifying the action or linking expressions, and all expressions modifying the expressions modifying action or linking expressions collectively perform the function of fully defining the action or linkage, respectively, associated with the subject of the sentence, and are all members of a second functional set. All expressions of an indirect object of any action expressed in a sentence, all expressions modifying the indirect object expressions, and all expressions modifying the expressions modifying the indirect object expressions collectively perform the function of fully defining the persons or things indirectly affected by the action, and are all members of a third functional set. All expressions of a direct object of any and all action expressed in a sentence, all expressions modifying the direct object expressions, and all expressions modifying the expressions modifying the direct object expressions collectively perform the function of fully defining the persons or things that are directly affected by the action, and are all members of a fourth functional set. All expressions which are an object of a preposition, all expressions modifying the object of preposition expressions, and all expressions modifying the expressions modifying the object of a preposition expressions collectively perform the function of fully defining the persons or things which are being connected to another expression by the preposition, and are all members of a fifth functional set. All predicate expressions, i.e., expressions which are linked to a subject expression of a sentence by a linking expression of the second functional set, all expressions modifying the predicate expressions, and all expressions modifying the expressions modifying the predicate expressions collectively perform the function of explaining, identifying with, or otherwise equating to the subject expression, and are all members of a sixth functional set.

Referring to FIG. 1, a schema, generally designated 2, according to the system of this invention is illustrated as having six rows and six columns of indicia separated by a gap 4. In this schema the foundation elements and the modifiers of foundation elements are presented, but no function words. Function words are excluded because they have no lexical meaning.

Referring again to FIG. 1, indicia representing foundation elements of all forms and functions are grouped together as a class and disposed in a plurality of adjacent rows, all rows being parallel to an ordinate 6, each row comprising all of the possible foundation elements of a sentence of a common form in the order that said elements are commonly used in a sentence. Most commonly the subject expression precedes all other foundation expressions and therefore the first indicia in each row represents a form of subject expression. An action or linking expression most commonly follows next after the subject expression. It should be noted that action and linking expressions in the English language are only in word form and therefore the second indicia in each row represents an action or linking expression in word form. If an indirect object expression is present, it most commonly follows immediately after an action expression, and therefore indicia representing the forms of an indirect object expression appear in their respective rows next after the action indicia. If a direct object expression is present, it most commonly follows immediately after an action expression unless an indirect object is also present in which case it follows the indirect object expression. Therefore indicia representing the forms of a direct object expression appear in their respective rows next after the indirect object indicia. Prepositional phrases often appear in connection with the object of a sentence, and therefore indicia representing expressions of the object of a preposition appear in their respective rows next after the direct object indicia. If a predicate expression is present, it always follows a linking expression, and therefore indicia representing the forms of a predicate expression appear in their respective rows after the linking indicia, albeit not immediately after. The number of rows corresponds to the number of forms of said foundation elements. Since under this system all possible foundation elements have been divided into three possible forms, the three rows correspond to the three forms. Row one 8 contains only foundation elements of the third form, row two 10 contains only foundation elements of the second form, and row three 12 contains only foundation elements of the first form.

Referring again to FIG. 1, indicia representing foundation element modifiers of all forms and functions are disposed in a plurality of adjacent rows, all parallel to said ordinate, each row containing only modifying elements of a common form, the number of rows corresponding to the number of forms of modifying elements. Since under this system all possible foundation element modifiers have been divided into three possible forms, the three modifier rows correspond to the three possible modifier forms. Row four 14 of the schema contains only modifiers of the first form, row five 16 contains only modifiers of the second form, and row six 18 contains only modifiers of the third form. From a functional set standpoint, each modifier row is ordered so as to correspond to the order of the rows of foundation elements, i.e., the functional set order of the modifier rows matches the functional set order of the foundation elements.

Referring again to FIG. 1, each column comprises foundation elements and modifiers belonging to a common functional set. Since under this system, the foundation elements together with their modifiers have been divided into six possible functional sets, the six columns correspond to the six functional sets. From the left, the first column 20 contains only members of the first functional set, to wit: subject expressions in word S1, phrase S2 and clause S3 forms; and subject expression modifiers in word SA1, phrase SA2 and clause SA3 forms. The second column 22 contains only members of the second functional set, to wit: action and linking expressions A/L, but only in word form since that is the only form in which they can be found; and modifiers of action and linking expressions in word AV1, phrase AV2 and clause AV3 forms. The third column 24 contains only members of the third functional set, to wit: indirect object expressions in word IO1, phrase IO2 and clause IO3 forms; and indirect object expression modifiers in word IA1, phrase IA2 and clause IA3 forms. The fourth column 26 contains only members of the fourth functional set, to wit: direct object expressions in word DO1, phrase DO2 and clause DO3 forms; and direct object expression modifiers in word DA1, phrase DA2 and clause DA3 forms. The fifth column 28 contains only members of the fifth functional set, to wit: object of preposition expressions in word OP1, phrase OP2 and clause OP3 forms; and object of preposition modifiers in word OA1, phrase OA2 and clause OA3 forms. The sixth column 30 contains only members of the sixth functional set, to wit: predicate expressions in word PN1, phrase PN2 and clause PN3 forms; and modifiers of said predicate expressions in word PA1, phrase PA2 and clause PA3 forms.

Referring again to FIG. 1, adjacent certain modifier indicia, in their respective rows and columns, are smaller indicia 32 representing the class of sentence constituents designated as modifiers of modifiers. The smaller or subindicia are indicative of the fact that said modifiers of modifiers serve to modify sentence constituents of the class designated as modifiers of foundation elements. Their presence adjacent the certain foundation element modifiers and not others indicates some apparent limitations. It appears that at the present state of the English language only those forms of class two modifiers marked by the subindicia can be themselves modified. However, the English language is a vital and evolving langauge and such apparent limitations may change.

The schema of this system is a linguistic template which can be used both in the analysis of a sentence and in the synthesis of a sentence. In one mode of operation, a sentence to be analyzed can be indicated in the gap 4. The person is thereby assisted in his or her analysis by the fact that the sentence is amidst a schema of all possible classes (excluding function words which are easily distinguishable), forms and functions of the constituents of the sentence. Analysis of the sentence therefore becomes a task of merely matching a constituent with its proper schema indicia. There must be a match for all constituents, excluding function words. After using the schema in such a fashion for a number of times, the schema becomes a part of a person's memory and the person thereafter can use a mental image of the schema to do the matching mentally.

Figure 2:
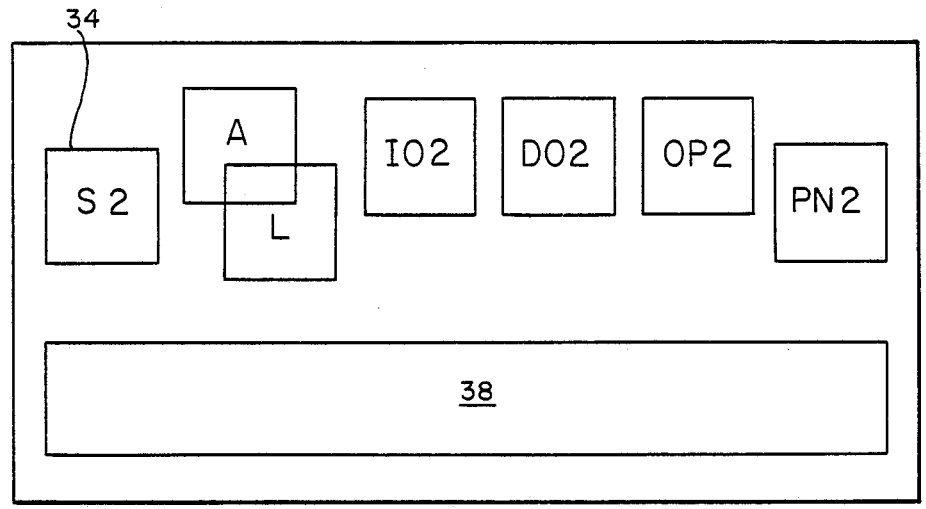
FIG. 2 is a sub-schema of the schema of FIG. 1.
Figure 3:
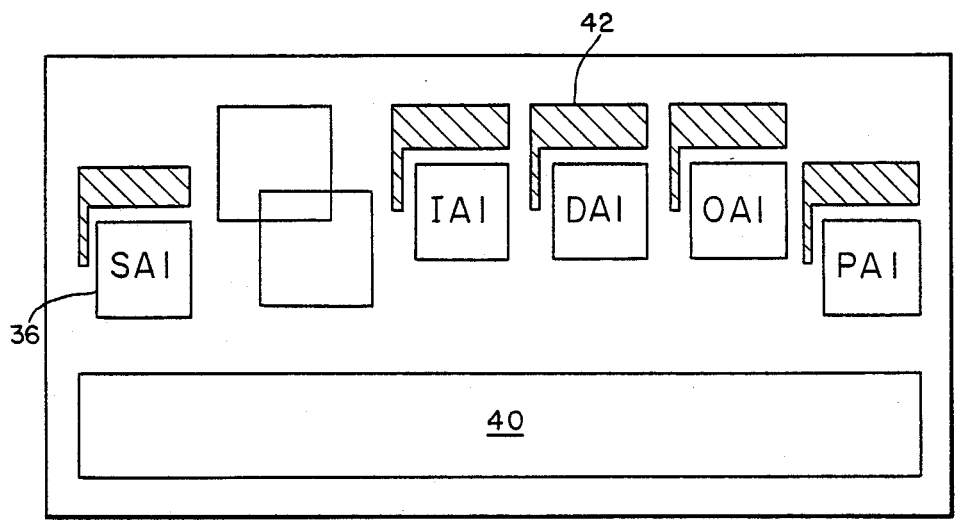
FIG. 3 is a sub-schema of the schema of FIG. 1.

Learning the schema can be aided by use of sub-schema as shown in FIGS. 2 and 3. A selected row (34 of FIG. 1 and 36 of FIG. 2) of the schema of FIG. 1 is isolated and a sentence containing constituents of the class, form and function of that isolated row is presented to a person learning the schema in a sentence display area (38 and 40 respectively). The person then has a more simplified task of finding only the constituents that match the indicia of the isolated row. FIG. 2 illustrates a sub-schema containing a foundation element row of indicia. FIG. 3 illustrates a sub-schema containing a class two modifier row of indicia. The background shading 42 of each indicia in FIG. 3 illustrates the fact that said indicia are related to foundation elements and cannot stand alone.

In using the schema for the synthesis of sentences, a person can use the schema to analyze the construct of his or her sentences after their composition.

Analysis of complex sentences is accomplished using a "top-down" approach, that is, the overall structure of a sentence is analyzed by categorizing any and all dependent clauses as third form constituents. Then the dependent clauses can be individually analyzed. Compound sentences are analyzed by separately analyzing each independent clause component. Compound-complex sentences are analyzed by using both techniques in combination.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A method of syntactically categorizing the constituents of an English language sentence, comprising the steps:

(a) defining all expressions of the subject of a sentence, all expressions modifying said subject expressions, and all expressions modifying said expressions modifying said subject expressions to be members of a first functional set, (b) defining all expressions of action being performed by or upon a subject expression of a sentence, all expressions linking the subject expression to a predicate expression, all expressions modifying said action or linking expressions, and all expressions modifying said expressions modifying action or linking expressions to be members of a second functional set, (c) defining all expressions of an indirect object of any action, all expressions modifying said indirect object expressions, and all expressions modifying said expressions modifying said indirect object expressions to be members of a third functional set, (d) defining all expressions of a direct object of any action, all expressions modifying said direct object expressions, and all expressions modifying said expressions modifying said direct object expressions to be members of a fourth functional set, (e) defining all expressions which are an object of a preposition, all expressions modifying said object of preposition expressions, and all expressions modifying said expressions modifying said object of a preposition expressions to be a fifth functional set, (f) defining all predicate expressions, all expressions modifying said predicate expressions, and all expressions modifying said expressions modifying said predicate expressions to be members of a sixth functional set, (g) defining each member of the first through sixth functional sets which is in word form to be a member of a first form set, (h) defining each member of the first through sixth functional sets which is a phrase to be a member of a second form set, (i) defining each member of the first through sixth functional sets which is a clause to be a member of a third form set, (j) defining each member of the first through sixth functional sets which is a foundation element to be a member of a first class set, (k) defining each member of the first through sixth functional sets which modifies a foundation element to be a member of a second class set, and (l) defining each member of the first through sixth functional sets which modifies a modifier to be a member of a third class set.

2. A system for analyzing the syntactical structure of an English language sentence comprising the steps:

(a) defining all expressions of the subject of a sentence, all expressions modifying said subject expressions, and all expressions modifying said expressions modifying said subject expressions to be members of a first functional set, (b) defining all expressions of action being performed by or upon a subject expression of a sentence, all expressions linking the subject expression to a predicate expression, all expressions modifying said action or linking expressions, and all expressions modifying said expressions modifying action or linking expressions to be members of a second functional set, (c) defining all expressions of an indirect object of any action, all expressions modifying said indirect object expressions, and all expressions modifying said expressions modifying said indirect object expressions to be members of a third functional set, (d) defining all expressions of a direct object of any action, all expressions modifying said direct object expressions, and all expressions modifying said expressions modifying said direct object expressions to be members of a fourth functional set, (e) defining all expressions which are an object of a preposition, all expressions modifying said object of preposition expressions, and all expressions modifying said expressions modifying said object of a preposition expressions to be a fifth functional set, (f) defining all predicate expressions, all expressions modifying said predicate expressions, and all expressions modifying said expressions modifying said predicate expressions to be members of a sixth functional set, (g) defining each member of the first through sixth functional sets which is in word form to be a member of a first form set, (h) defining each member of the first through sixth functional sets which is a phrase to be a member of a second form set, (i) defining each member of the first through sixth functional sets which is a clause to be a member of a third form set, (j) defining each member of the first through sixth functional sets which is a foundation element to be a member of a first class set, (k) defining each member of the first through sixth functional sets which modifies a foundation element to be a member of a second class set, (l) defining each member of the first through sixth functional sets which modifies a modifier to be a member of a third class set, (m) creating an image of a schema comprised of a set of individually distinct indicia, a half of the indicia corresponding to all possible forms and functions of foundation elements, and the other indicia corresponding to all possible forms and functions of foundation element modifiers, and (n) matching or attempting to match the constituents of the sentence with their corresponding indicia of the schema image.

3. The system according to claim 2 wherein step (m) comprises the step of creating a schema comprised of a matrix of rows and columns wherein indicia representing foundation element constituents are grouped together in three adjacent rows, each row comprising all possible foundation elements of a sentence of a common form, the rows being uniformly ordered in the order that said foundation elements are typically used in a sentence; and wherein indicia representing foundation element modifier constituents are grouped together in three adjacent rows, each row containing only modifiers of a common form, the functional set order of the modifier rows matching the functional set order of the foundation element constituents' rows.

4. A method of graphically arranging indicia representing the constituents of a sentence comprising the steps:

(a) grouping indicia representing all possible forms and functions of foundation elements in a plurality of adjacent rows, all rows being parallel to an ordinate, each row comprising all of the possible foundation elements of a sentence of a common form in the order that said elements are typically used in a sentence, the number of rows corresponding to the number of forms of said foundation elements, and (b) grouping indicia representing all possible forms and functions of foundation element modifiers in a plurality of adjacent rows, all parallel to said ordinate, each row being ordered to correspond to the foundation elements which they modify, and each row containing only modifying elements of a common form, the number of rows corresponding to the number of forms of modifying elements.

5. A schema representing an English language sentence syntactical construct based on a categorization of the constituents of any such sentence which uniquely characterizes each of said constituents according to its class, function and form, the schema comprising:

(a) separate groupings of said constituents by class, each class being graphically distinguishable from the other classes, (b) a plurality of columns, each column comprising a general alignment of all constituents which perform a common function, the disposition of the constituents within each column being consistent with the separate and distinguishable groupings by class, and (c) a plurality of rows, each row comprising a general alignment of all constituents belonging to a common class and having a common form, the disposition of the rows and the disposition of the constituents within each row being consistent with said columns and the separate and distinguishable groupings by class.

6. The schema according to claim 5 wherein the columns are ordered to match the order in which their respective constituents most commonly appear in a sentence.

7. The schema according to claim 5 wherein the schema is in legible form and further comprises at least a class grouping of foundational elements spaced apart from a class grouping of modifiers, the space therebetween being adapted to have written thereon a sentence which is being analyzed or synthesized.

8. The schema according to claim 6 wherein the schema is in legible form and further comprises at least a class grouping of foundational elements spaced apart from a class grouping of modifiers, the space therebetween being adapted to have written thereon a sentence which is being analyzed or synthesized.

9. The schema according to claim 5 wherein one of the class groupings is a grouping of modifiers, and further comprising indicia associated with at least a subset of said modifiers indicating that the members of said subset can be themselves be modified.

10. The schema according to claim 6 wherein one of the class groupings is a grouping of modifiers, and further comprising indicia associated with at least a subset of said modifiers indicating that the members of said subset can be themselves be modified.

11. The schema according to claim 7 wherein one of the class groupings is a grouping of modifiers, and further comprising indicia associated with at least a subset of said modifiers indicating that the members of said subset can be themselves be modified.

12. The schema according to claim 8 wherein one of the class groupings is a grouping of modifiers, and further comprising indicia associated with at least a subset of said modifiers indicating that the members of said subset can be themselves be modified.

* * * * *